Patented Mar. 20, 1923.

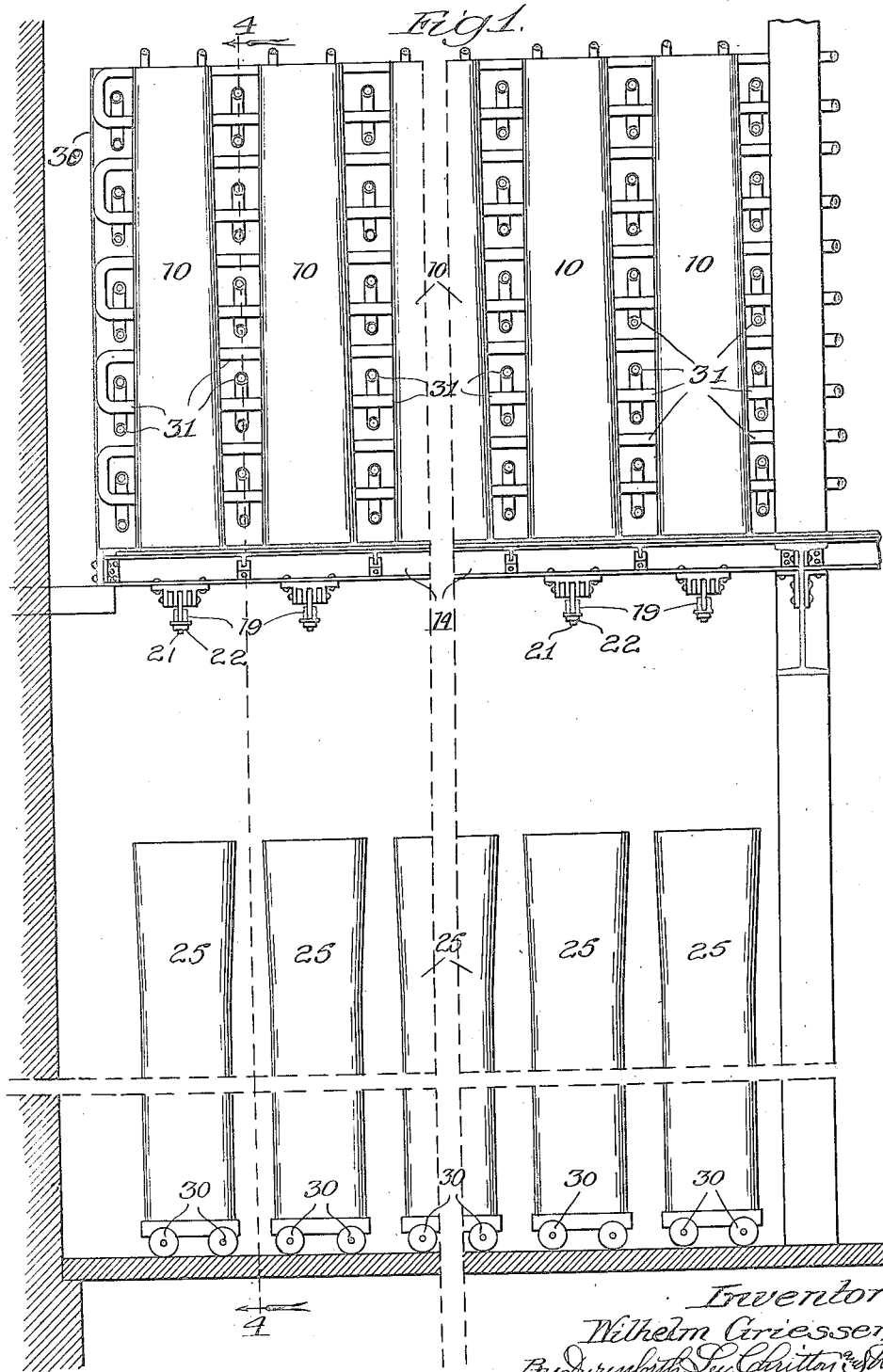

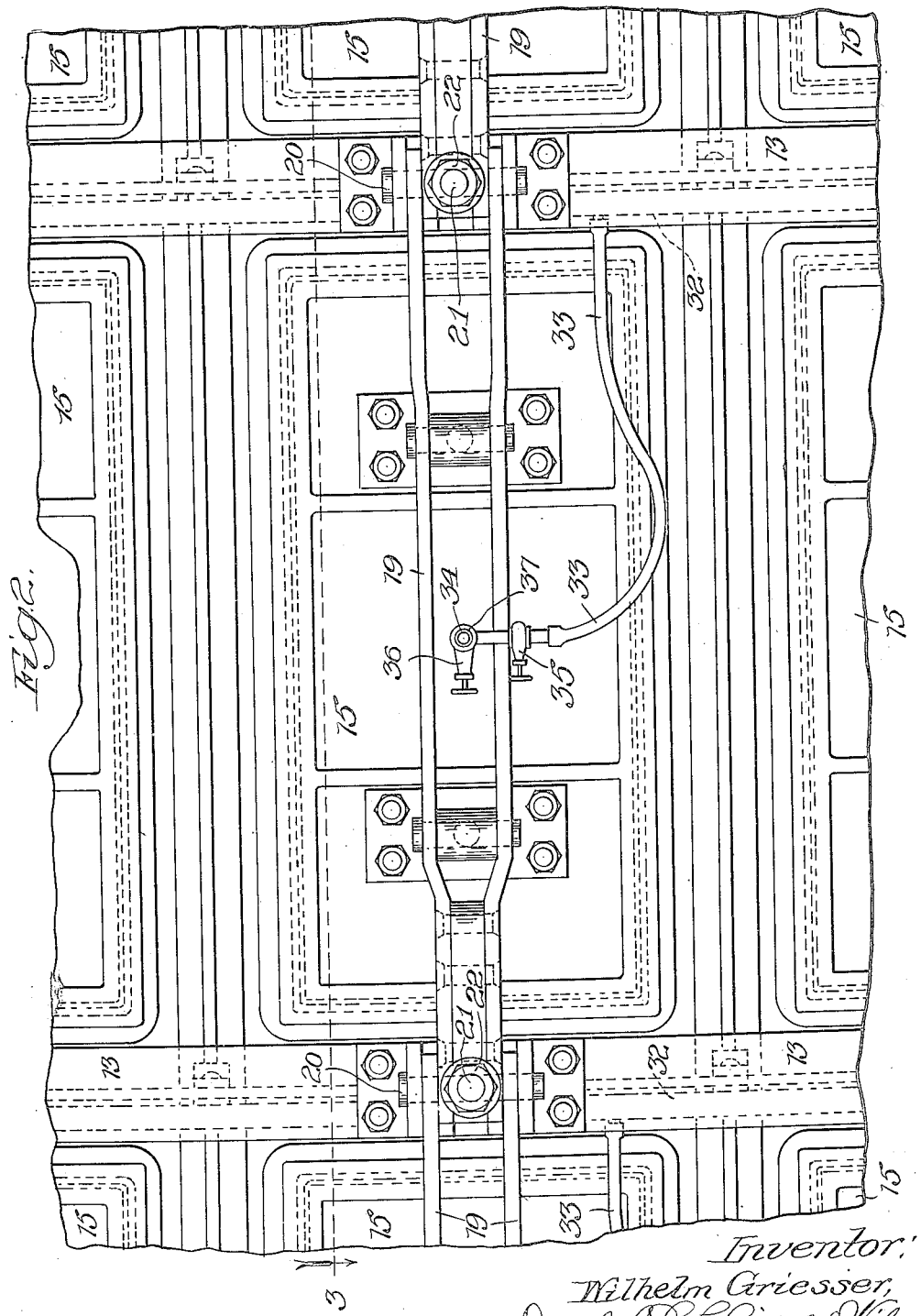

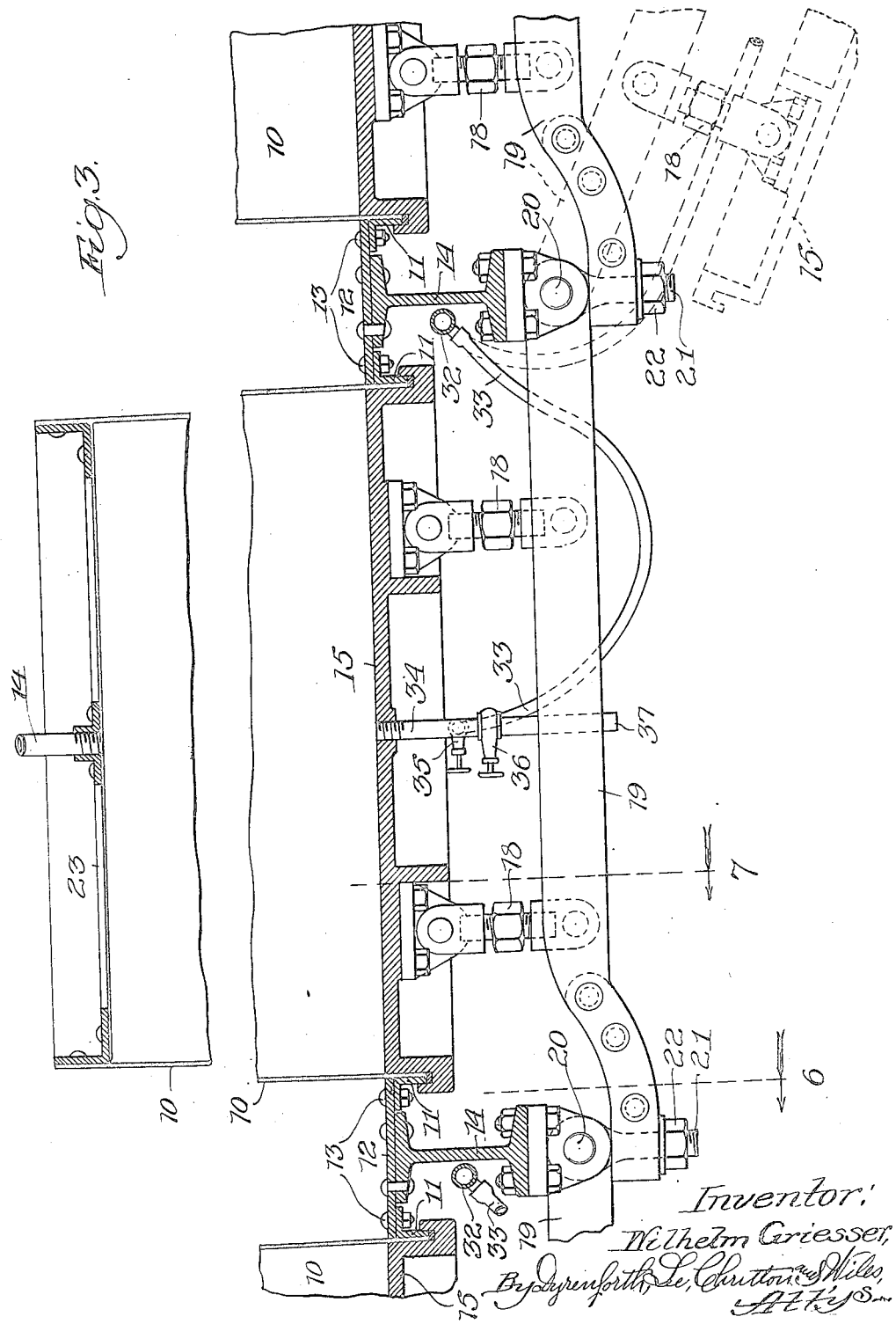

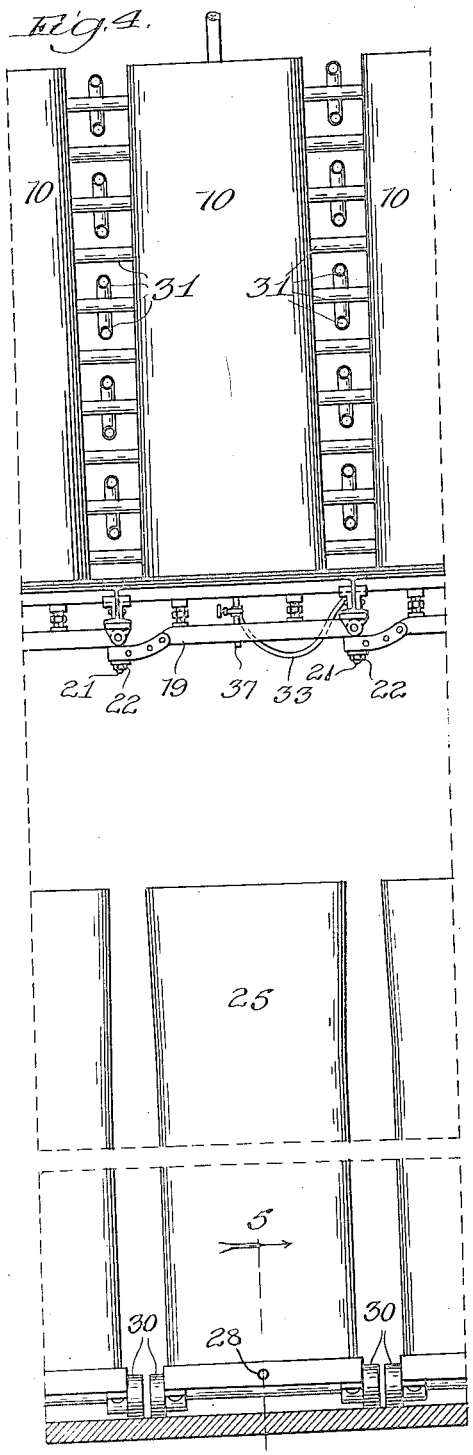
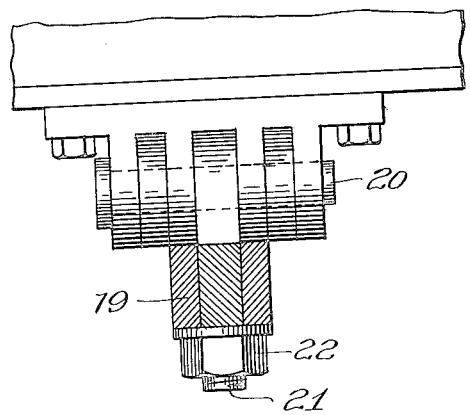
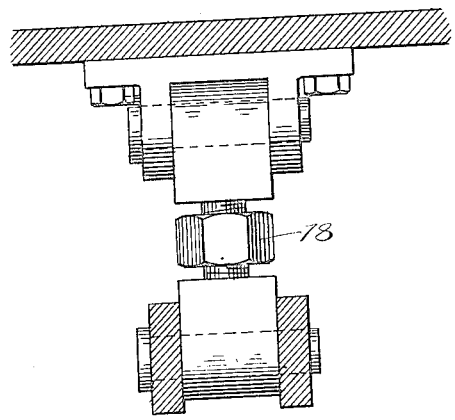
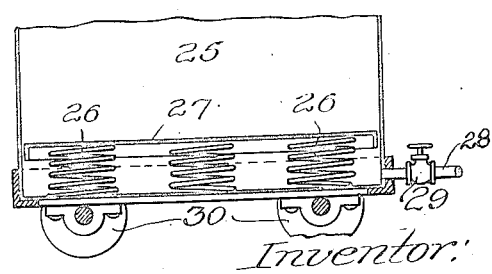

1,449,225

UNITED STATES PATENT OFFICE.

WILHELM GRIESSER, OF PITTSBURGH, PENNSYLVANIA.

ICE-MAKING APPARATUS.

Application filed June 13, 1921. Serial No. 477,100.

*To all whom it may concern:*

Be it known that I, WILHELM GRIESSER, a citizen of the United States, residing at Pittsburgh, in the county of Allegheny and State of Pennsylvania, have invented a new and useful Improvement in Ice-Making Apparatus, of which the following is a specification.

This invention relates to ice making apparatus and is fully described in the following specification and shown in the accompanying drawings in which:

Figure 1 is a partial vertical section through the apparatus;

Fig. 2 is an enlarged bottom plan view of a door for the molds;

Fig. 3 is a partial section on the line 3 of Fig. 2;

Fig. 4 is a partial section on the line 4 of Fig. 1;

Fig. 5 is a partial section on the line 5 of Fig. 4; and

Figs. 6 and 7 are partial vertical sections on the lines 6 and 7 respectively of Fig. 3.

The embodiment as illustrated consists of a battery of molds 10 preferably rectangular in form each having an angle iron 11 secured around its lower edge. These molds are arranged in rows in openings in the plate 12 to which the flanges 11 are secured by means of bolts 13, the whole being supported by means of I-beams 14 or the like. This permits each mold to be dropped separately thru the plate 12 as these molds are tapered toward the top as shown in Fig. 3.

These molds are closed at the bottom by means of doors 15 which have lips 16 surrounding the lower edge of the door and which hold gaskets of rubber and the like receiving the door. Each door is connected by means of adjustable links 18 to a swinging arm 19 which is pivotally connected at 20 to the I-beam 14. The opposite end of the arm 19 is bifurcated to receive the eye bolt 21 which is pivotally carried by the pin 20 on the adjoining I-beam. A nut 22 serves to hold the arm 19 in the raised position.

The method of the operation of this part of the apparatus is as follows. The door 15 is closed by raising the arm 19 and securing it in place by means of the nut 22, the adjustable links 18 having previously been shortened somewhat to permit of an easy closing of the door. After the arm 19 is locked by means of the nut 22, the adjustable links 18 are set up so as to tighten the door 15 and give it a uniform pressure at all points. Water is then placed in the molds 10 and frozen as will later be explained.

To remove the cake of ice from the mold the links 18 are shortened somewhat so as to loosen the door 15 and the arm 19 is released and drawn into the dotted line position as shown in Figure 3. To facilitate the ice cake dropping out of the mold, the mold is slightly tapered as shown in this figure. In some cases it is desirable to introduce warmer brine into the tank surrounding the molds in order to cause the ice to melt slightly at the points where it touches the mold. As an additional aid in removing the ice cake the top of the mold may be closed as at 23 and a pipe 24 connected to the top of the mold and to a source of air pressure which is controlled by a suitable valve (not shown). This pipe may also be used for filling the mold with water.

In order to receive the cake when it is dropped, I have provided a receiver 25 which is slightly flared at the top and which is substantially the same size at the bottom as the cake of ice. Sufficient space is provided between the top of the receiver 25 and the bottom of the molds to permit the arm 19 to swing clear of the receiver.

As the ice cake drops into the receiver, the air caught beneath the ice cake is released slowly between the sides of the cake and the sides of the receiver 25 so that it descends slowly. Springs 26 may be placed in the bottom of the receiver which support a false bottom 27 so as to provide an additional cushioning means for the ice cake. A pipe 28 having a regulating valve 29 is connected to the space beneath the false bottom 27 so as to provide an adjustable means for regulating the flow of air out of this space. This pipe also serves to drain the water which forms by melting of the ice.

It will be understood that the molds are enclosed in a large tank, the side 39 of which is shown in Fig. 1, and that the space between the several molds is filled with a brine which is cooled in the usual way as by means of the ammonia pipes 31.

An air pipe 32 as shown in Fig. 3 connects a suitable source of air pressure to each of the molds by means of the flexible tubing 33 and the pipe 34. An air valve 35 controls the supply of air to each of the molds. The valve 36 and the pipe 37 also serve as drains for the mold.

The purpose of introducing air into the bottom of the mold is to agitate the water while it is being frozen. Where raw water is used, a "core" usually forms in the center of the ice cake which will not freeze into good, clear ice. When this "core" forms the valve 36 is opened and the core removed. The valve is then closed and fresh water added.

The large tank is divided by partitions into a number of sections so that the temperature of each section may be controlled separately. All the molds of a section are filled and when it is desired to remove the ice cakes, the brine is allowed to warm up or warm brine is pumped in, so that the ice in contact with the molds is slightly melted. As stated before, this permits it to drop freely from the mold.

After the ice cakes are placed in the receivers, they may be allowed to stand for some time. This floor below the freezing tanks thus becomes a storage for ice.

The receivers may also be carried on wheels 30 so that they may be moved about on the receiving floor.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. Ice making apparatus comprising permanent ice molds, means for closing the bottom of each mold while freezing ice therein and for uncovering the bottom to permit the ice cake to drop out, said molds being closed on top and means for applying gas pressure to the top of said cake to force it from the mold.

2. Ice making apparatus comprising permanent ice molds, means for closing the bottom of each mold while freezing ice therein and for uncovering the bottom to permit the ice cake to drop out, said molds being closed on top and means for applying fluid pressure to the top of said cake to force it from the mold.

WILHELM GRIESSER.